(12) United States Patent
Hagiwara

(10) Patent No.: US 12,494,220 B2
(45) Date of Patent: Dec. 9, 2025

(54) INFORMATION PROCESSING APPARATUS, CONTROL METHOD OF INFORMATION PROCESSING APPARATUS, AND STORAGE MEDIUM

(71) Applicant: CANON KABUSHIKI KAISHA, Tokyo (JP)

(72) Inventor: Keita Hagiwara, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 295 days.

(21) Appl. No.: 18/319,342

(22) Filed: May 17, 2023

(65) Prior Publication Data

US 2023/0377599 A1    Nov. 23, 2023

(30) Foreign Application Priority Data

May 20, 2022 (JP) ................. 2022-083067

(51) Int. Cl.
*G10L 15/00*     (2013.01)
*G06F 21/32*     (2013.01)
*G10L 17/00*     (2013.01)
*G10L 25/51*     (2013.01)

(52) U.S. Cl.
CPC .............. *G10L 25/51* (2013.01); *G06F 21/32* (2013.01); *G10L 17/00* (2013.01)

(58) Field of Classification Search
CPC ......... G10L 25/51; G10L 17/00; G06F 21/32; G06F 21/31; H04L 63/0853
USPC ........................................................ 704/246
See application file for complete search history.

(56) References Cited

U.S. PATENT DOCUMENTS 5,701,153 A * 12/1997 Reichek ............... H04N 5/9206
                                                              348/14.1
10,701,067 B1 * 6/2020 Ziraknejad .......... H04L 63/0853

FOREIGN PATENT DOCUMENTS

EP          E3562114 A1 * 12/2017
JP          2020502690 A     1/2020
JP          2020030739 A     2/2020

* cited by examiner

*Primary Examiner* — Md S Elahee
(74) *Attorney, Agent, or Firm* — Canon U.S.A., Inc. IP Division

(57) ABSTRACT

An information processing apparatus that registers apparatus information with a user account, the information processing apparatus includes a returning unit configured to perform user authentication and return information on a user account, a first receiving unit configured to receive, from a first apparatus, the information on the user account and voice information, a second receiving unit configured to receive, from a second apparatus, apparatus information of the second apparatus and voice information, a comparison unit configured to compare the voice information received by the first receiving unit and the voice information received by the second receiving unit to determine whether pieces of the voice information match, and a registration unit configured to register, in a case where the comparison unit determines that the pieces of the voice information match, the apparatus information received by the second receiving unit with the user account received by the first receiving unit.

13 Claims, 7 Drawing Sheets

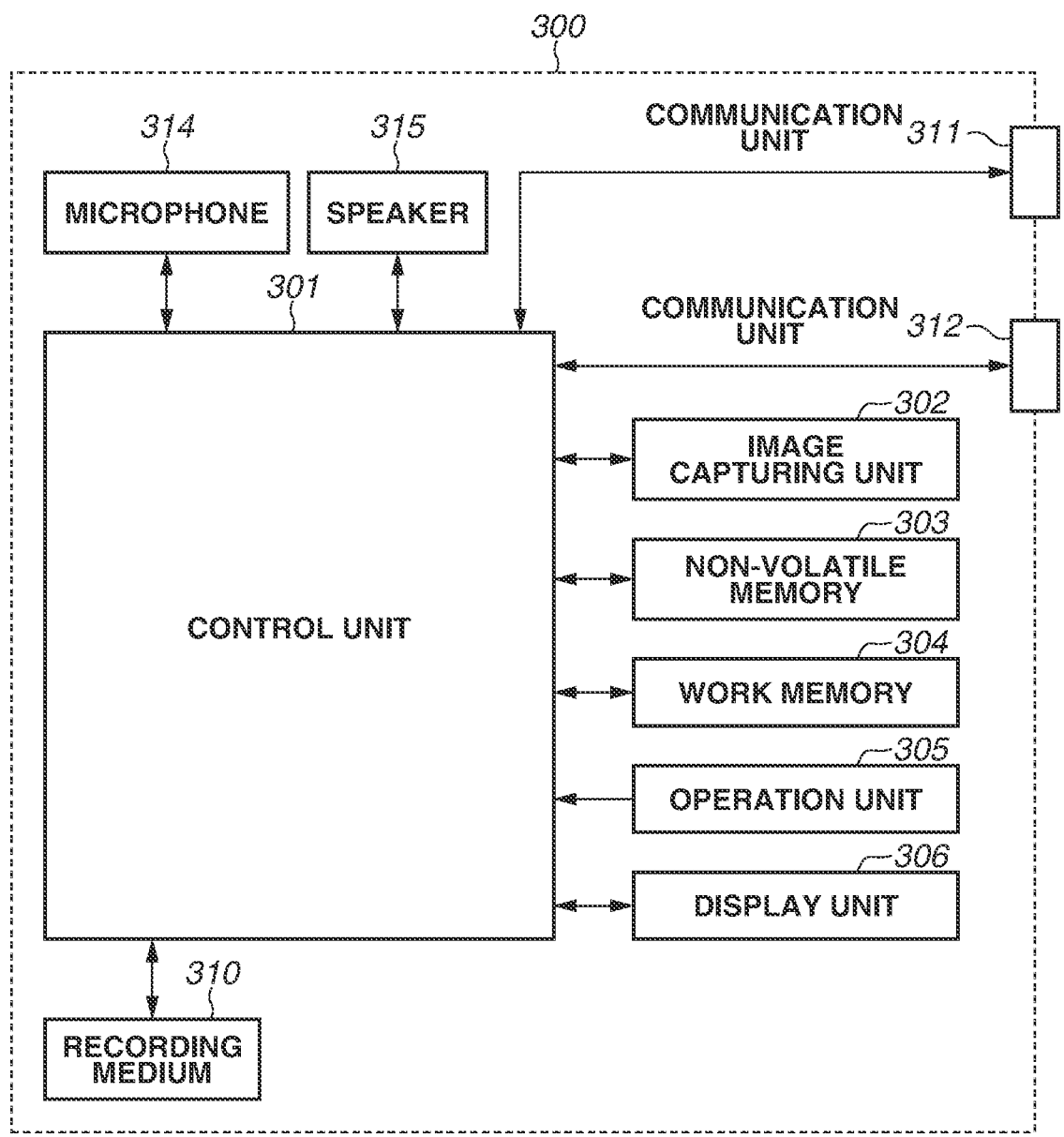

FIG.4A

| VOICEPRINT INFORMATION | USER UTTERED WORD | NON-USER UTTERED WORD | USER ACCOUNT IDENTIFICATION INFORMATION | APPARATUS INFORMATION | ASSOCIATION EXPIRATION LIMIT |
|---|---|---|---|---|---|
| 010101 | ASSOCIATION | HELLO | 00001 | null | 202106011200000 |
| 010101 | ASSOCIATION | HELLO | null | GHIJKLM | 202106011200005 |
| 020202 | SETTING | null | 00002 | null | 202106021000000 |

FIG.4B

| REGISTERED USER ACCOUNT IDENTIFICATION INFORMATION | REGISTERED APPARATUS INFORMATION |
|---|---|
| 00001 | ABCDEF |
| 00001 | GHIJKLM |

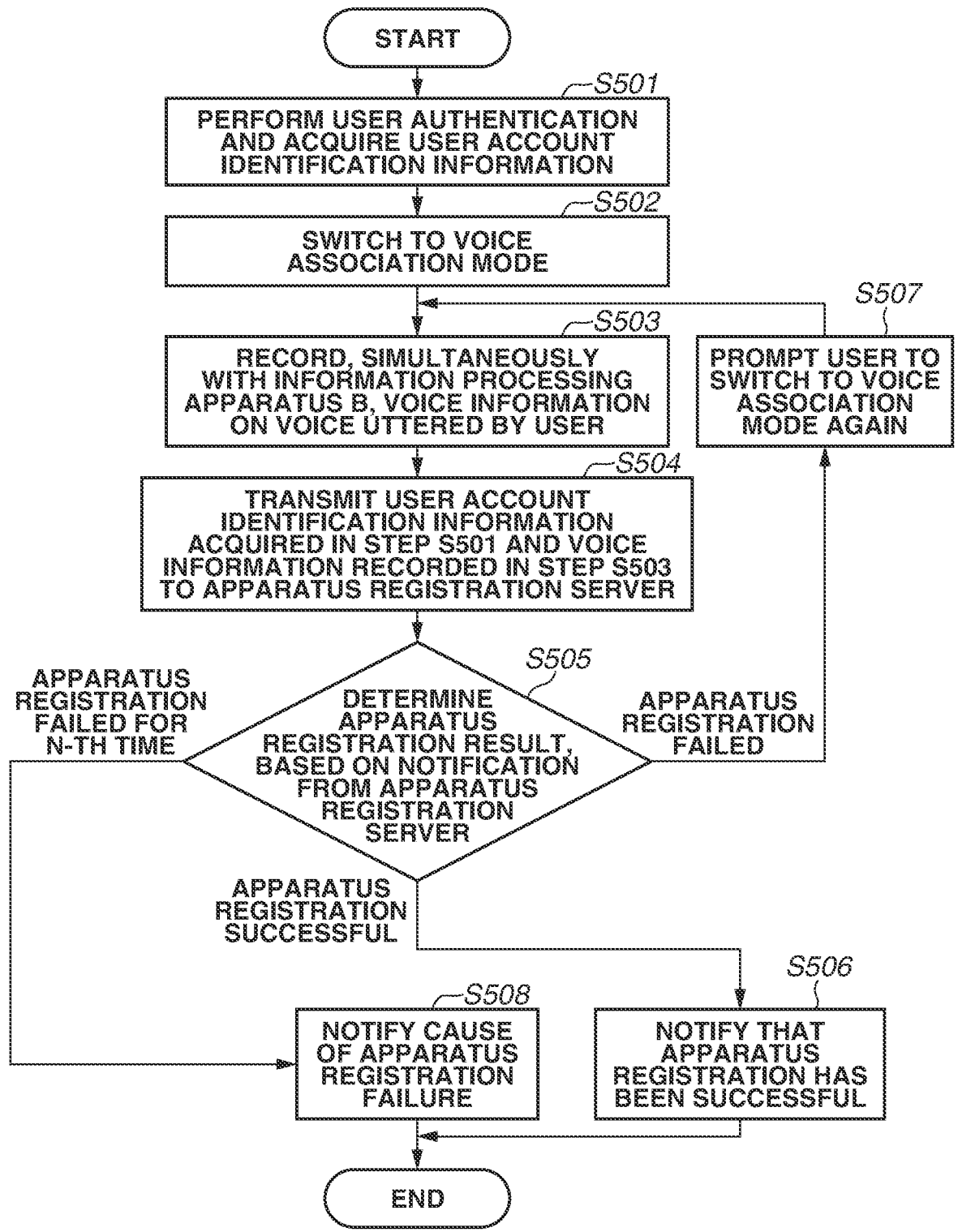

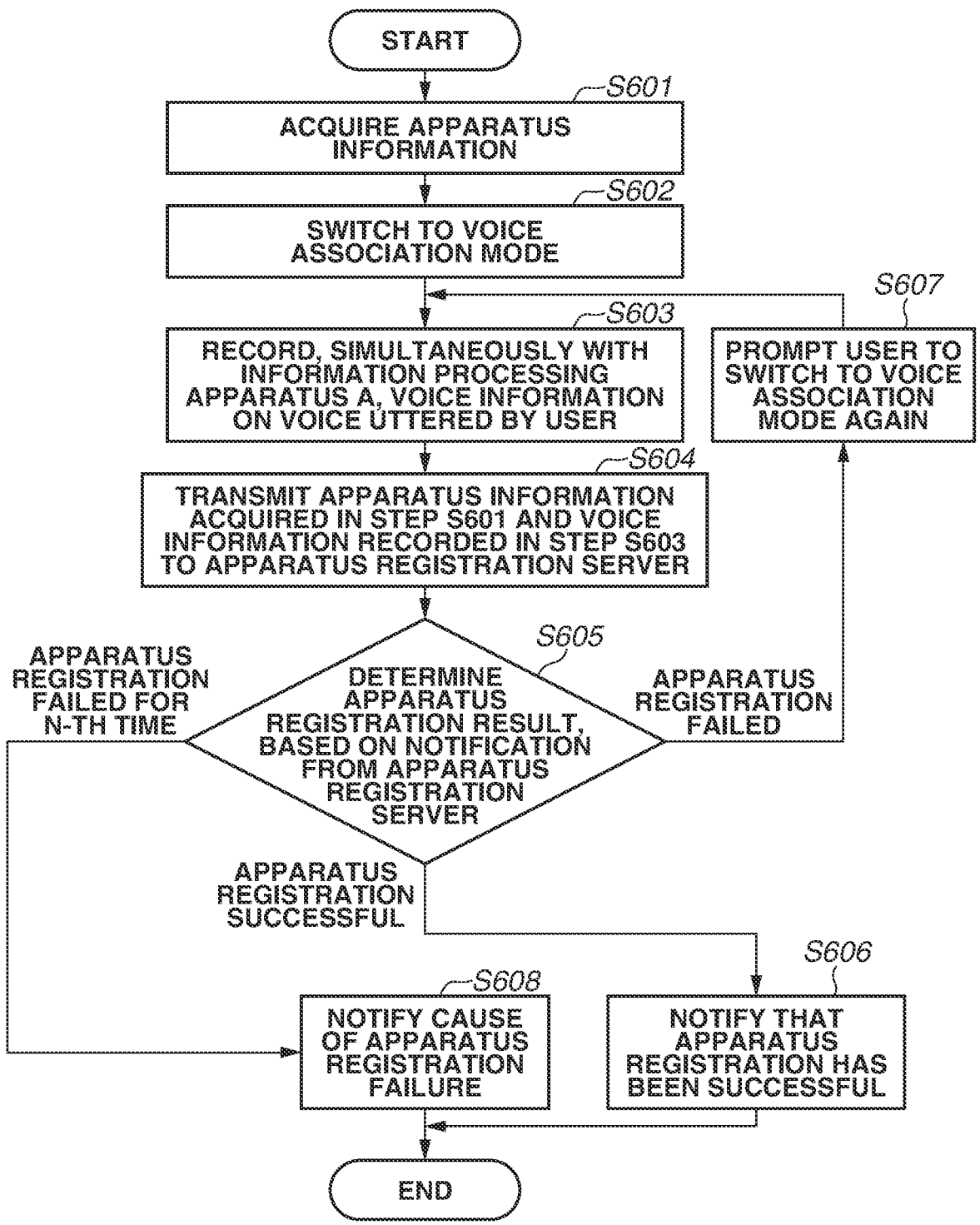

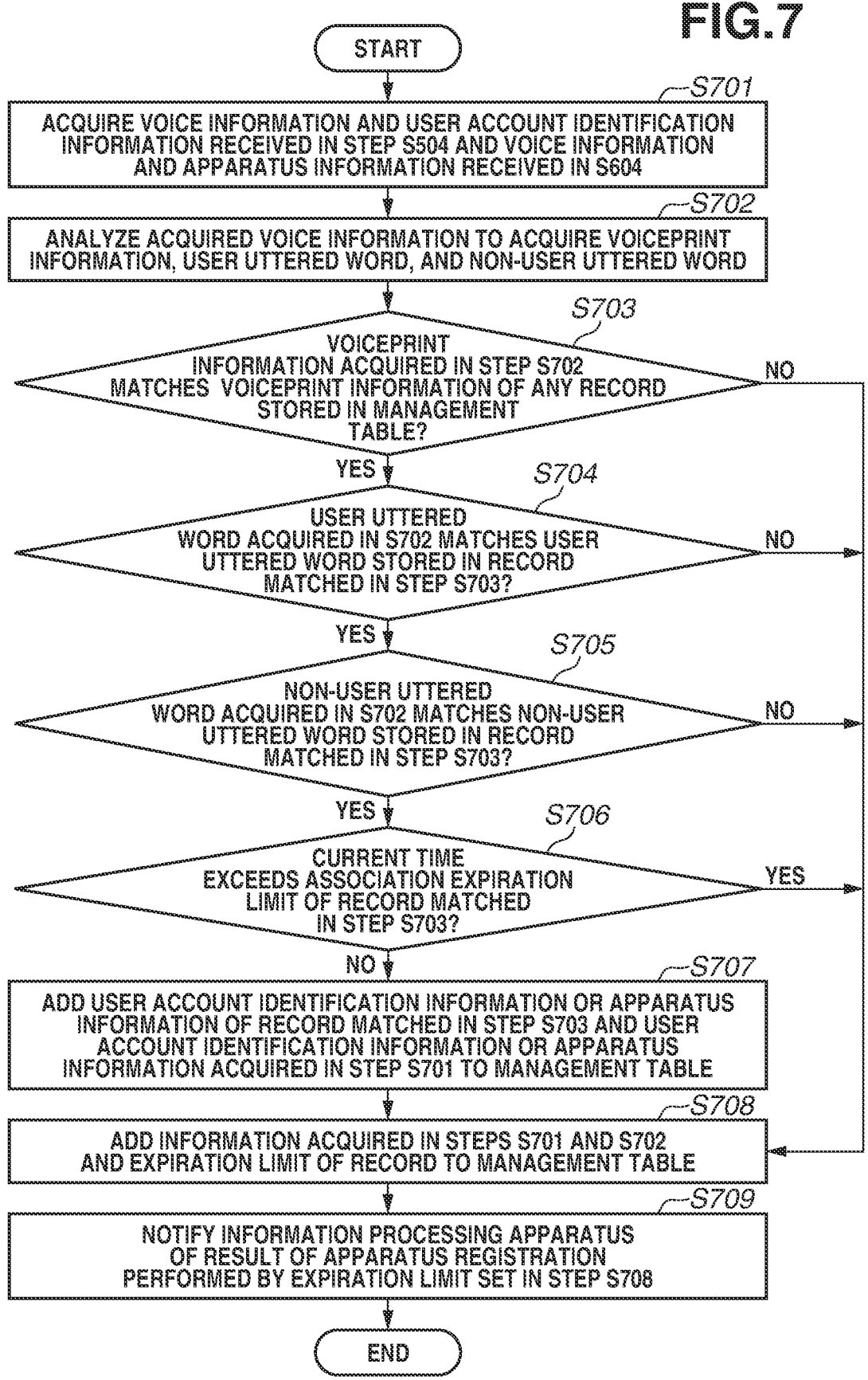

INFORMATION PROCESSING APPARATUS, CONTROL METHOD OF INFORMATION PROCESSING APPARATUS, AND STORAGE MEDIUM

BACKGROUND OF THE DISCLOSURE

Field of the Disclosure

The present disclosure relates to an information processing apparatus that communicates with an external apparatus.

Description of the Related Art

Some services establish an association between apparatus information on an information processing apparatus and a user account to perform certain processing.

Some information processing apparatuses do not include inputting means, such as a liquid crystal display. When apparatus information on this type of information processing apparatus is registered with a user account, the information processing apparatus is paired to a smartphone with Bluetooth® to use the smartphone as a display of the information processing apparatus.

Other than the above-described registration method using screen inputting, a registration method using voice has been studied. For example, Japanese Unexamined Patent Application Publication No. 2020-502690 discusses a technique in which a voice signal broadcasted from an information processing apparatus is detected by another information processing apparatus, and the another information processing apparatus verifies a code contained in the detected voice signal to determine whether the information processing apparatus is an apparatus of the same user.

Japanese Patent Application Laid-Open No. 2020-30739 discusses another technique in which an information processing apparatus records user information containing voice information in a recording medium, and user identification is performed based on an acquired voice and the recorded user information.

According to the prior art techniques, however, an automated voice produced by the information processing apparatus is utilized, and thus a user may not understand what kind of processing is performed.

SUMMARY OF THE DISCLOSURE

According to an aspect of the present disclosure, an information processing apparatus that registers apparatus information with a user account, the information processing apparatus includes a returning unit configured to perform user authentication and return information on a user account, a first receiving unit configured to receive, from a first information processing apparatus, the information on the user account and voice information, a second receiving unit configured to receive, from a second information processing apparatus, apparatus information of the second information processing apparatus and voice information, a comparison unit configured to compare the voice information received by the first receiving unit and the voice information received by the second receiving unit to determine whether pieces of the voice information match, and a registration unit configured to register, in a case where the comparison unit determines that the pieces of the voice information match, the apparatus information received by the second receiving unit with the user account received by the first receiving unit.

Further features of the present disclosure will become apparent from the following description of exemplary embodiments with reference to the attached drawings.

BRIEF DESCRIPTION OF THE DRAWINGS

FIG. 3 is a diagram illustrating a configuration of an information processing apparatus according to the present exemplary embodiment.

FIGS. 4A and 4B are diagrams each illustrating an example of data structure of the apparatus registration server according to the present exemplary embodiment FIG. 5 is a flowchart illustrating a processing procedure that is performed by an information processing apparatus to transmit user account identification information to the apparatus registration server, the information processing apparatus being an information processing apparatus A according to the present exemplary embodiment.

FIG. 6 is a flowchart illustrating a processing procedure that is performed by an information processing apparatus to transmit apparatus information to the apparatus registration server, the information processing apparatus being an information processing apparatus B according to the present exemplary embodiment.

FIG. 7 is a flowchart illustrating a processing procedure that is performed by an apparatus registration server to register apparatus information with a user account, the apparatus registration server being the apparatus registration server according to the present exemplary embodiment.

DESCRIPTION OF THE EMBODIMENTS

Hereinafter, an exemplary embodiment of the present disclosure will be described in detail with reference to the drawings.

<Example of System Configuration>

Figure 1:
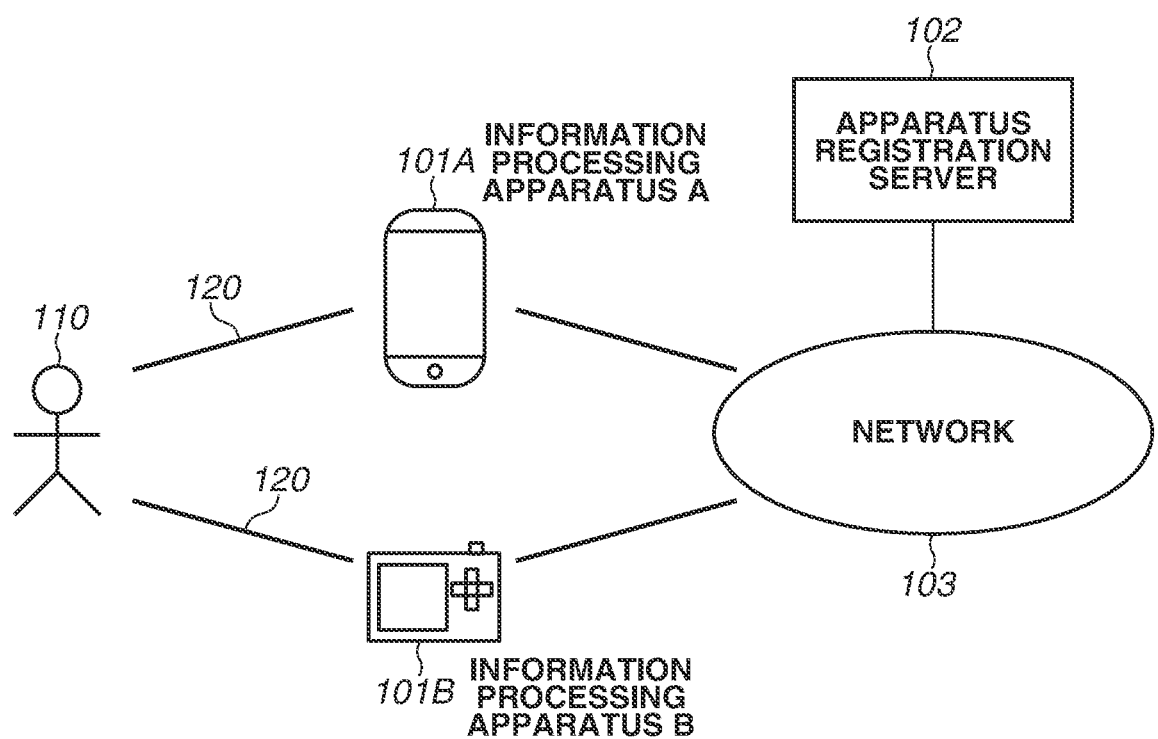
FIG. 1 is a diagram illustrating a system configuration according to an exemplary embodiment.

Hereinafter, an exemplary embodiment of the present disclosure will be described in detail with reference to the drawings. FIG. 1 is a diagram illustrating a system configuration according to the present exemplary embodiment.

As illustrated in FIG. 1, information processing apparatuses 101 including an information processing apparatus 101A and an information processing apparatus 101B according to the present exemplary embodiment is connected with an apparatus registration server 102 via a network 103.

The information processing apparatus 101A performs user authentication in cooperation with the apparatus registration server 102 and acquires identification information on a user account (user account identification information). Apparatus information on the information processing apparatus 101B is not registered with the user account.

The information processing apparatus 101A and the information processing apparatus 101B records a voice 120 uttered by a user 110. The information processing apparatus 101A and the information processing apparatus 101B access the apparatus registration server 102 by using a protocol, such as Hypertext Transfer Protocol Secure (HTTPS), and transmit information generated using a description language, such as Extensible Markup Language (XML), containing voice information on the recorded voice.

The apparatus registration server 102 analyzes pieces of the received voice information transmitted from the information processing apparatuses 101A and 101B to determine whether the recorded voices of the pieces of the voice information are uttered by the same person. In a case where the apparatus registration server 102 determines that the recorded voices of the pieces of the voice information transmitted from the information processing apparatuses 101A and 101B are uttered by the same person, the apparatus registration server 102 establishes an association between user account identification information transmitted from the information processing apparatus 101A and apparatus information transmitted from the information processing apparatus 101B.

Because information for the voice analysis is transmitted and received via the network 103, the transmission and reception is encrypted using Secure Sockets Layer (SSL).

Alternatively, because information for the voice analysis is transmitted and received via the network 103, the transmission and reception can be limited to the information processing apparatus 101 which has been authorized.

<Block Diagram of Apparatus Registration Server>

Figure 2:
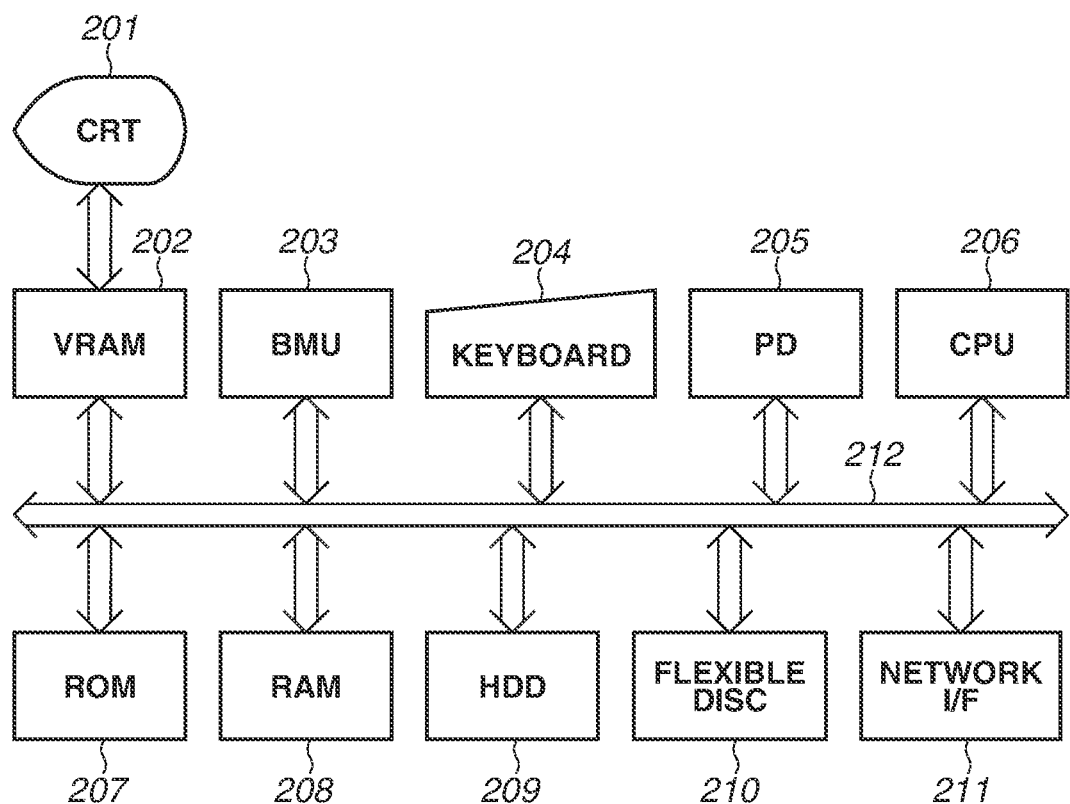
FIG. 2 is a block diagram illustrating a configuration example of an apparatus registration server according to the present exemplary embodiment.

FIG. 2 is a block diagram illustrating a configuration example of the apparatus registration server 102 according to the present exemplary embodiment. As illustrated in FIG. 2, the apparatus registration server 102 includes a cathode-ray tube (CRT) display 201, a video random access memory (VRAM) 202, a bit manipulation unit (BMU) 203, and a keyboard 204. The apparatus registration server 102 further includes a pointing device (PD) 205, a central processing unit (CPU) 206, a read-only memory (ROM) 207, a random-access memory (RAM) 208, a hard disk drive (HDD) 209, a flexible disc 210, a network interface (I/F) 211, and a bus 212.

The CRT display 201 displays an icon, a message, a menu, and other pieces of user interface information for management of the information processing apparatus 101.

The VRAM 202 stores data of images drawn to be displayed on the CRT display 201.

The image data stored in the VRAM 202 is transmitted to the CRT display 201 in accordance with a predetermined requirement, whereby an image is displayed on the CRT display 201.

The BMU 203 controls data transmission between memories, for example, between the VRAM 202 and another memory, and data transmission between a memory and an input/output device, such as the network I/F 211.

The keyboard 204 includes various types of keys to receive input of texts and the like. The PD 205 is used for, for example, selection of an icon and an instruction of a menu and other contents displayed on the CRT display 201 and a drag-and-drop operation of an object displayed on the CRT display 201.

The CPU 206 controls each device based on a control program, such as an operating system (OS) and a program to be described below, stored in the ROM 207, the HDD 209, or the flexible disc 210. The ROM 207 stores various types of control programs and data. The RAM 208 includes a work area of the CPU 206, a data saving area that is used during error processing, and a control program loading area.

The HDD 209 stores various types of control programs that are executed in the apparatus registration server 102, data temporarily stored, and the like. The network I/F 211 communicates with the information processing apparatus 101 via the network 103.

The bus 212 includes an address bus, a data bus, and a control bus. A control program can be supplied to the CPU 206 from the ROM 207, the HDD 209, or the flexible disc 210. Alternatively, a control program can be supplied from an information processing apparatus or the like by using a network via the network I/F 211.

<Configuration Diagram of Information Processing Apparatus>

FIG. 3 is a diagram illustrating a hardware configuration example of an information processing apparatus 300 serving as the information processing apparatus 101 according to the present exemplary embodiment.

The information processing apparatus 300 is implemented by an electronic device, such as a smartphone, an image capturing apparatus, a tablet device, and a personal computer, that has a sound acquisition function and is capable of connecting to an Internet.

A control unit 301 controls each unit in the information processing apparatus 300 in accordance with an input signal or a program to be described below. Instead of the control unit 301, entire operation of the information processing apparatus 300 can be controlled by a plurality of pieces of hardware sharing a process.

A non-volatile memory 303 is a memory that can electrically delete or store information. The non-volatile memory 303 stores an OS that is basic software executed by the control unit 301, and an application that realizes a practical function in cooperation with the OS. In the present exemplary embodiment, the non-volatile memory 303 stores an application software program (hereinbelow referred to as apparatus registration application) that is for registration of apparatus information on the information processing apparatus 300 with a user account.

A work memory 304 is used as an image display memory of a display unit 306 and a work area of the control unit 301.

An operation unit 305 receives an instruction for the information processing apparatus 300 from the user. The operation unit 305 includes, for example, a power button that is used by the user to turn on or off the power of the information processing apparatus 300, and an operation member, such as a touch screen, formed on the display unit 306. As a member of the operation unit 305, the operation unit 305 includes a touch screen that can detect a touch operation performed on the display unit 306. The touch screen and the display unit 306 can be integrally configured. For example, the touch screen is configured to have a light transmittance not interfering with a display on the display unit 306 and disposed over a top layer of a display surface of the display unit 306. Input coordinates on the touch screen and display coordinates on the display unit 306 are associated with each other. This configuration can form a graphical user interface (GUI) that can provide a feeling of directly operating a screen displayed on the display unit 306. The control unit 301 detects the following operations to or states of the touch screen:

a touch operation performed by a finger or a pen to the touch screen (hereinbelow referred to as touch-down);
  a state in which the finger or the pen touches the touch screen (hereinbelow referred to as touch-on);
  a state in which the finger or the pen touching the touch screen moves (hereinbelow referred to as move);
  a separation operation of the finger or the pen touching the touch screen from the touch screen (hereinbelow referred to as touch-up); and
  a state in which neither of the finger nor the pen touches the touch screen (hereinbelow referred to as touch-off).

The above-described operations and states and coordinates of a position where the finger or the pen touches the touch screen is transmitted to the control unit 301 via an internal bus, and the control unit 301 determines what type of operation is performed, based on the received information. As for a move, a movement direction of the finger or the pen moving on the touch screen can also be determined on a vertical component basis and a horizontal component basis on the touch screen, based on a change in coordinates of the position. In a case where the control unit 301 detects an operation which has started from a touch-down and ended with a touch-up after a move at a certain distance on the touch screen, the control unit 301 determines that a stroke has been drawn. An operation of a quickly drawing stroke is referred to as a flick. A flick is an operation involving a certain distance movement of a finger touching the touch screen and a separation of the finger from the touch screen after the movement, which, in other words, is an operation of the finger moving on the touch screen with a quick flick. In a case where, after detection of a move of equal to or more than a predetermined distance at equal to or more than a predetermined speed, a touch-up is detected immediately after the detection of the move, the control unit 301 determines that a flick is performed. In a case where the control unit 301 detects a move of equal to or more than the predetermined distance at less than the predetermined speed, the control unit 301 determines that a drag is performed. In a case where a touch-up is detected in an extremely short time after a touch-down, the control unit 301 determines that a tap is performed. Examples of a type of the touch screen include a resistive type, a capacitive type, a surface acoustic wave type, an infrared type, an electromagnetic induction type, an image recognition type, an optical sensor type, and the like, and any of the types can be used for the touch screen.

The display unit 306 displays image data, texts for an interactive operation, and the like. The display unit 306 can be omitted from the information processing apparatus 300. In this case, it may be sufficient that the information processing apparatus 300 can connect to an external display unit and have a display control function of controlling display processing in the external display unit.

A recording medium 310 stores voice information and the like. The recording medium 310 can be configured to be detachable from the information processing apparatus 300 or can be built in the information processing apparatus 300. More specifically, it may be sufficient that the information processing apparatus 300 at least includes means for accessing the recording medium 310.

The communication unit 311 is an interface to connect the information processing apparatus 300 to an external apparatus. The information processing apparatus 300 in the present exemplary embodiment transmits and receives data to and from the external apparatus via the communication unit 311. In the present exemplary embodiment, the communication unit 311 is an antenna and the control unit 301 connects the information processing apparatus 300 to the external apparatus via the antenna. In the present exemplary embodiment, the communication unit 311 includes an interface for a communication with the external apparatus using a wireless local area network (LAN) compliant with the Institute of Electrical and Electronics Engineers (IEEE) 802.11 standard. The control unit 301 controls the communication unit 311 to realize a wireless communication with the external apparatus. A method for the communication is not limited to the wireless LAN, and an infrared communication method can also be used.

A communication unit 312 is an interface to connect the information processing apparatus 300 to an external apparatus. The information processing apparatus 300 transmits and receives data to and from the external apparatus via the communication unit 312. In the present exemplary embodiment, the communication unit 312 includes an interface for a communication with the external apparatus using Bluetooth® compliant with the IEEE 802.15.1 standard. The control unit 301 controls the communication unit 312 to realize a wireless communication with the external apparatus. A method of the communication is not limited to Bluetooth®, and wireless LAN compliant with the IEEE 802.11 standard and an infrared communication method can also be used.

Hereinbelow, a description will be given using the information processing apparatus 101A including an input device for user authentication means and the information processing apparatus 101B not including user authentication means, and a procedure of establishing association between apparatus information of the information processing apparatus 101B and a user account will be described.

The description will be given of a case in which apparatus information on the information processing apparatus 101A has been registered with a user account of the apparatus registration server 102, and the procedure starts from processing for an association operation after the information processing apparatus 101A and the information processing apparatus 101B have switched to a voice association mode.

The information processing apparatus 101 in the present exemplary embodiment can be any type of apparatus as long as the apparatus is an electric device having a sound acquisition function and capable of connecting to an Internet. The registrable number of the information processing apparatus 101 is not limited to one, and the number can be two or more.

<Data Structure Diagram of Apparatus Registration Server>

FIGS. 4A and 4B are diagrams each illustrating an example of data structure of the apparatus registration server 102 according to the present exemplary embodiment. FIG. 4A illustrates some pieces of voice information that has been received from the information processing apparatus 101 and managed in the apparatus registration server 102. A management table 400 is a table of received voice information. Voiceprint information 401 stores user voiceprint information obtained by analysis of the received voice information. User uttered word 402 stores a user uttered word obtained by analysis of the received voice information. Non-user uttered word 403 stores a non-user uttered word obtained by analysis of the received voice information. User account identification information 404 stores user account identification information transmitted from the information processing apparatus 101. Apparatus information 405 stores apparatus information transmitted from the information processing apparatus 101. An association expiration limit 406 stores a time until when a record can be referred to. Because records 407 and 408 have the same voiceprint information, it can be determined that the records 407 and 408 are information of the same user.

Further, because the records 407 and 408 have the same user uttered word and the same non-user uttered word, and the association expiration limits of the records 407 and 408 are close to each other, it can be determined that the two information processing apparatuses 101 have simultaneously acquired the voice uttered by a user. Because, based on information contained in a record 409, the record 409 has a voiceprint information different from the voiceprint information of the records 407 and 408, it can be determined that the record 409 is information on another user.

The data illustrated in FIG. 4B is managed in the apparatus registration server 102, and FIG. 4B illustrates some pieces of information registration of which has been completed. A management table 410 is a table of registered user account identification information and registered apparatus information. Registered user account identification information 411 stores user account identification information registration of which has been completed. Registered apparatus information 412 stores apparatus information registration of which has been completed. Because records 413 and 414 have the same registered user account identification information, it can be determined that the two information processing apparatuses 101 are registered to a user account 00001.

<Flowchart of Information Processing Apparatus A>

FIG. 5 is a flowchart illustrating a processing procedure of the information processing apparatus 101A according to the present exemplary embodiment to transmit the user account identification information 404 to the apparatus registration server 102. The user account information has been registered with the apparatus registration server 102.

In step S501, the information processing apparatus 101A accesses the apparatus registration server 102 to perform user authentication and acquires user account identification information.

In step S502, the information processing apparatus 101A switches to the voice association mode.

In step S503, the information processing apparatus 101A records, simultaneously with the information processing apparatus 101B, a voice uttered by the user 110.

In step S504, the information processing apparatus 101A transmit the user account identification information acquired in step S501 and voice information of the voice recorded in step S503 to the apparatus registration server 102.

In step S505, the information processing apparatus 101A performs determination of an apparatus registration result notified from the apparatus registration server 102. In a case where the notified apparatus registration result indicates that the apparatus registration has been successful (APPARATUS REGISTRATION SUCCESSFUL in step S505), the processing proceeds to step S506. In a case where the notified apparatus registration result indicates that the apparatus registration has been failed (APPARATUS REGISTRATION FAILED in step S505), the processing proceeds to step S507. In a case where the notified apparatus registration result indicates that the apparatus registration has been failed, and also, the apparatus registration has been failed for n-th times on a consecutive basis (APPARATUS REGISTRATION FAILED FOR N-TH TIME in step S505), the processing proceeds to step S508.

In step S506, the information processing apparatus 101A notifies that the apparatus registration has been successful, and the processing ends. Because this configuration causes the notification to be performed in close proximity to the user, the user can realize unauthorized registration of an unintended information processing apparatus if such an apparatus is registered.

In step S507, the information processing apparatus 101A prompts the user to switch the information processing apparatus 101A to the voice association mode again.

In step S508, the information processing apparatus 101A notifies of a cause of the apparatus registration failure contained in the notification from the apparatus registration server 102, and the processing ends.

<Flowchart of Information Processing Apparatus 101B>

FIG. 6 is a flowchart illustrating a processing procedure of the information processing apparatus 101B according to the present exemplary embodiment to transmit apparatus information to the apparatus registration server 102.

In step S601, the information processing apparatus 101B acquires apparatus information that has been set.

In step S602, the information processing apparatus 101B switches to the voice association mode.

In step S603, the information processing apparatus 101B records, simultaneously with the information processing apparatus 101A, a voice uttered by the user 110.

In step S604, the information processing apparatus 101B transmits the apparatus information acquired in step S601 and voice information of the voice recorded in step S603 to the apparatus registration server 102.

In step S605, the information processing apparatus 101B performs determination of an apparatus registration result notified from the apparatus registration server 102. In a case where the notified apparatus registration result indicates that the apparatus registration has been successful (APPARATUS REGISTRATION SUCCESSFUL in step S605), the processing proceeds to step S606. In a case where the notified apparatus registration result indicates that the apparatus registration has been failed (APPARATUS REGISTRATION FAILED in step S605), the processing proceeds to step S607. In a case where the notified apparatus registration result indicates that the apparatus registration has been failed, and also, the apparatus registration has been failed for n-th times on a consecutive basis (APPARATUS REGISTRATION FAILED FOR N-TH TIME in step S605), the processing proceeds to step S608.

In step S606, the information processing apparatus 101B notifies that the apparatus registration has been successful, and the processing ends. Because this configuration causes the notification to be performed in close proximity to the user, the user can realize unauthorized registration of an unintended information processing apparatus if such an apparatus is registered.

In step S607, the information processing apparatus 101B prompts the user to switch the information processing apparatus 101B to the voice association mode again.

In step S608, the information processing apparatus 101B notifies of a cause of the apparatus registration failure contained in the notification from the apparatus registration server 102, and the processing ends.

<Flowchart of Apparatus Registration Server 102>

FIG. 7 is a flowchart illustrating a processing procedure of the apparatus registration server 102 according to the present exemplary embodiment to register apparatus information with a user account.

In step S701, the apparatus registration server 102 acquires the voice information and the user account identification information received in step S504 and acquires the voice information and the apparatus information received in step S604.

In step S702, the apparatus registration server 102 analyzes the voice information acquired in step S701 to acquire voiceprint information, a user uttered word, and a non-user uttered word.

In step S703, the apparatus registration server 102 determines whether the voiceprint information acquired in step S702 matches the voiceprint information 401 of any record stored in the management table 400. In a case where the management table 400 has voiceprint information that matches the acquired voiceprint information (YES in step S703), the processing proceeds to step S704. In a case where the management table 400 does not have voiceprint information that matches the acquired voiceprint information (NO in step S703), the processing proceeds to step S708.

In step S704, the apparatus registration server 102 determines whether the user uttered word acquired in step S702 matches the user uttered word 402 of the record matched in step S703. In a case where the acquired user uttered word matches the user uttered word 402 of the matched record (YES in step S704), the processing proceeds to step S705. In a case where the acquired user uttered word does not match the user uttered word 402 of the matched record (NO in step S704), the processing proceeds to step S708.

In step S705, the apparatus registration server 102 determines whether the non-user uttered word acquired in step S702 matches the non-user uttered word 403 of the record matched in step S703. In a case where the acquired non-user uttered word matches the non-user uttered word 403 of the matched record (YES in step S705), the processing proceeds to step S706. In a case where the acquired non-user uttered word does not match the non-user uttered word 403 of the matched record (NO in step S705), the processing proceeds to step S708.

In step S706, the apparatus registration server 102 compares a current time and the association expiration limit 406 of the record matched in step S703. In a case where the current time does not exceed the association expiration limit 406 (YES in step S706), the processing proceeds to step S707. In a case where the current time exceeds the association expiration limit 406 (NO in step S706), the processing proceeds to step S708.

In step S707, the apparatus registration server 102 adds the user account identification information 404 or the apparatus information 405 of the record matched in step S703 and the user account identification information or the apparatus information acquired in step S701 to the management table 410 as a new record.

With the above-described processing, the apparatus information associated with the user account can be referenced.

In step S708, the apparatus registration server 102 adds, as a new record, the information acquired in steps S701 and S702 and an association expiration limit until which the record can be referenced, to the management table 400.

In step S709, the apparatus registration server 102 notifies the information processing apparatus 101 of a result of apparatus registration performed by the expiration limit set in step S708 and information to be used. With this configuration, the processing in steps S505 and S605 can be changed in accordance with a result of apparatus registration.

The present disclosure has been described above together with the exemplary embodiment, the present disclosure is not limited to the above-described exemplary embodiment, and various modifications and changes can be made within the gist of the present disclosure. Some or parts of the above-describe exemplary embodiment can be combined with each other.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-083067, filed May 20, 2022, which is hereby incorporated by reference herein in its entirety.

What is claimed is:

1. An information processing apparatus that registers apparatus information with a user account, the information processing apparatus comprising:
    a returning unit configured to perform user authentication and return information on a user account;
    a first receiving unit configured to receive, from a first information processing apparatus, the information on the user account and voice information;
    a second receiving unit configured to receive, from a second information processing apparatus, apparatus information of the second information processing apparatus and voice information;
    a comparison unit configured to compare the voice information received by the first receiving unit and the voice information received by the second receiving unit to determine whether pieces of the voice information match; and
    a registration unit configured to register, in a case where the comparison unit determines that the pieces of the voice information match, the apparatus information received by the second receiving unit with the user account received by the first receiving unit,
    wherein the first information processing apparatus and the second information processing apparatus are configured to record a user uttered word simultaneously prior to transmitting the voice information from the first information processing apparatus to the information processing apparatus and the voice information from the second information processing apparatus to the information processing apparatus.

2. The information processing apparatus according to claim 1, further comprising:
    a recording unit configured to record, when the first receiving unit receives information from the first information processing apparatus or when the second receiving unit receives information from the second information processing apparatus, the received information in a case where there is no information to be compared with the received information by the comparison unit;
    wherein the comparison unit compares, when the first receiving unit receives information from the first information processing apparatus or when the second receiving unit receives information from the second information processing apparatus and in a case where there is information to be compared with the received information, the received information with voice information recorded by the recording unit.

3. The information processing apparatus according to claim 1, further comprising:
a first analysis unit configured to perform an analysis to acquire the user uttered word from the voice information,
wherein the comparison unit uses the user uttered word acquired by the first analysis unit for the comparison.

4. The information processing apparatus according to claim 1, further comprising:
a second analysis unit configured to perform an analysis to acquire a non-user uttered word from the voice information,
wherein the comparison unit uses the non-user uttered word acquired by the second analysis unit for the comparison.

5. The information processing apparatus according to claim 1, further comprising a transmission unit configured to transmit a result of registration performed by the registration unit to the first information processing apparatus or the second information processing apparatus.

6. The information processing apparatus according to claim 5, further comprising:
a notification unit configured to notify, in a case where the registration is successful, a user of successful registration, and notify, in a case where the registration is failed, the user of a registration failure, in accordance with the result transmitted from the transmission unit.

7. A method for controlling an information processing apparatus that registers apparatus information with a user account, the method comprising:
performing user authentication and returning information on a user account;
receiving, as first receiving, from a first information processing apparatus, the information on the user account and voice information;
receiving, as second receiving, from a second information processing apparatus, apparatus information of the second information processing apparatus and voice information;
comparing the voice information received by the first receiving and the voice information received by the second receiving to determine whether pieces of the voice information match; and
registering, in a case where the comparison unit determines that the pieces of the voice information match, the apparatus information received by the second receiving with the user account received by the first receiving,
wherein the first information processing apparatus and the second information processing apparatus are configured to record a user uttered word simultaneously prior to transmitting the voice information from the first information processing apparatus to the information processing apparatus and the voice information from the second information processing apparatus to the information processing apparatus.

8. The method for controlling the information processing apparatus according to claim 7, the method comprising:
recording, when information is received from the first information processing apparatus in the first receiving or when information is received from the second information processing apparatus in the second receiving, the received information in a case where there is no information to be compared with the received information in the comparing;
wherein, when information is received from the first information processing apparatus in the first receiving or when information is received from the second information processing apparatus in the second receiving and in a case where there is information to be compared with the received information, the received information with voice information recorded by the recording unit.

9. The method for controlling the information processing apparatus according to claim 7, the method comprising:
performing a first analysis to acquire the user uttered word from the voice information,
wherein the user uttered word acquired by the first analysis is used in the comparing.

10. The method for controlling the information processing apparatus according to claim 7, the method comprising:
performing a second analysis to acquire a non-user uttered word from the voice information,
wherein the non-user uttered word acquired by the second analysis unit is used in the comparing.

11. The method for controlling the information processing apparatus according to claim 7, the method further comprising transmitting a result of the registering to the first information processing apparatus or the second information processing apparatus.

12. The method for controlling the information processing apparatus according to claim 11, further comprising notifying, in a case where the registering is successful, a user of successful registration, and notifying, in a case where the registering is failed, the user of a registration failure, in accordance with the result transmitted in the transmitting.

13. A non-transitory computer-readable storage medium which stores a program for causing a computer to execute a method for registering apparatus information with a user account, the method comprising:
performing user authentication and returning information on a user account;
receiving, as first receiving, from a first information processing apparatus, the information on the user account and voice information;
receiving, as second receiving, from a second information processing apparatus, apparatus information of the second information processing apparatus and voice information;
comparing the voice information received by the first receiving and the voice information received by the second receiving to determine whether pieces of the voice information match; and
registering, in a case where the comparison unit determines that the pieces of the voice information match, the apparatus information received by the second receiving with the user account received by the first receiving,
wherein the first information processing apparatus and the second information processing apparatus are configured to record a user uttered word simultaneously prior to transmitting the voice information from the first information processing apparatus to the information processing apparatus and the voice information from the second information processing apparatus to the information processing apparatus.

* * * * *